United States Patent [19]

Gappa et al.

[11] 4,276,178
[45] * Jun. 30, 1981

[54] APPARATUS FOR PURIFICATION OF WASTE WATER BY MEANS OF ACTIVE CARBON

[75] Inventors: Günther Gappa, Gelsenkirchen-Buer; Harald Jüntgen; Jürgen Klein, both of Essen, all of Fed. Rep. of Germany

[73] Assignee: Bergwerksverband GmbH, Essen, Fed. Rep. of Germany

[ * ] Notice: The portion of the term of this patent subsequent to May 13, 1997, has been disclaimed.

[21] Appl. No.: 46,500

[22] Filed: Jun. 7, 1979

Related U.S. Application Data

[63] Continuation of Ser. No. 602,000, Aug. 5, 1975, Pat. No. 4,202,770.

[30] Foreign Application Priority Data

Aug. 6, 1974 [DE] Fed. Rep. of Germany ....... 2437745

[51] Int. Cl.³ .............................................. B01D 15/02
[52] U.S. Cl. ..................................... 210/662; 210/189; 210/289
[58] Field of Search ................. 210/25, 33, 96.1, 189, 210/268, 279, 291, 289, 662, 676

[56] References Cited

U.S. PATENT DOCUMENTS

| | | | |
|---|---|---|---|
| 1,770,580 | 7/1930 | Neumann | 210/289 |
| 2,057,887 | 10/1936 | Elliott et al. | 210/268 |
| 3,878,096 | 4/1975 | Somogi | 210/189 |
| 3,915,861 | 10/1975 | Marquardt | 210/189 |
| 3,998,731 | 12/1976 | Franzen | 210/33 |
| 4,202,770 | 5/1980 | Gappa et al. | 210/291 |

FOREIGN PATENT DOCUMENTS 445352 11/1972 France ...................................... 210/189

*Primary Examiner*—Ivars C. Cintins
*Attorney, Agent, or Firm*—Michael J. Striker

[57] ABSTRACT

Apparatus for purification of waste water includes an upright adsorber filled with active carbon passing in downward direction through the adsorber while waste water flows in upward direction therethrough. A distributing arrangement is produced at the region of the lower end of the adsorber, into which waste water is fed, and constructed to assure a substantial even distribution of the waste water during its upward flow through the carbon column. A regulating arrangement is provided to regulate the flow of the carbon through the adsorber in dependence on the concentration of the organic contaminants adsorbed by the carbon.

6 Claims, 2 Drawing Figures

APPARATUS FOR PURIFICATION OF WASTE WATER BY MEANS OF ACTIVE CARBON

This is a continuation of application Ser. No. 602,000, filed Aug. 5, 1975, now U.S. Pat. No. 4,202,770.

BACKGROUND OF THE INVENTION

The present invention relates to an apparatus for removing organic contaminants dissolved in waste water by means of an adsorber filled with active carbon and passing in downward direction therethrough, whereas the waste water flows in counter current direction to the carbon through the adsorber.

In such apparatus for purification of waste water by adsorption of the organic contaminants dissolved therein, a uniform distribution of the waste water through the cross-section of the adsorber as well as a parallel flow of the active carbon laden with the contaminants, is necessary.

To bind organic contaminants dissolved in waste water by adsorption to active carbon to thereby purify the waste water is well known in the art. Usually, the adsorbed contaminants are again removed from the active carbon by thermally treating the latter, whereafter the active carbon will again be used for purifying waste water. While reversibly bound contaminants may be desorbed strictly by raising the temperature, irreversibly bound contaminants must be removed by partial gasification of the active carbon. The loss of active carbon resulting thereby from the reaction of the gasification means with the active carbon may be on the order of 5 to 15 percent for each regeneration. The amount of loss of active carbon of course increases during purification of industrial waste water since due to the high percentage of carbon containing contaminants the loading of the active carbon proceeds very fast so that repeated regeneration of the active carbon is necessary.

In a process in which the laden active carbon is continuously discharged from the adsorber, it is necessary to hold the volume of the stream of laden active carbon between adsorber and regenerator as small as possible to thereby reduce the loss of active carbon. This can be accomplished when the active carbon is discharged from the adsorber in a state in which it is laden to the maximum with adsorbed contaminants.

SUMMARY OF THE INVENTION

It is an object of the present invention to provide an apparatus for a purification of waste water by active carbon in an adsorber in which the active carbon is passed in downward direction through the adsorber and the waste water is passed counter currently therethrough substantially uniformly distributed through the downwardly passing active carbon and in which the speed of the downwardly passing active carbon is so regulated that a uniform and high loading of the active carbon with the organic contaminants contained in the waste water is obtained to thereby reduce the stream of active carbon to be regenerated to the smallest volume possible and to reduce loss of active carbon.

With these and other objects in view which will become apparent as the description proceeds, the apparatus for purification of waste water with active carbon mainly comprises an upright adsorber having a frustoconical outlet end, inlet means for continuously feeding active carbon into the upper end of the adsorber so that the carbon forms a column filling the adsorber up to a level slightly below the upper end of the same and leaves the adsorber through an outlet opening at the bottom of the frustoconical outlet end. A distributor cone is arranged in the region of the upper third of the frustoconical outlet end and is provided in the wall thereof with a plurality of apertures, in which the sum of the open cross-section of the apertures is 0.1 to 1% of the transverse cross-section of the adsorber. The distributor cone is closed at the base and defines between the outer circumference of its base and the wall of the outlet cone an annular gap through which carbon passes to the outlet opening. A feed conduit for continuously feeding waste water into the distributor cone is provided so that the waste water flows upwardly through the apertures and the carbon in the adsorber, and is discharged in a purified manner in the region of the upper end of said adsorber above the level of the carbon therein.

The angle between a generatrix of the frustoconical outlet end of the adsorber and a horizontal line is preferably between 50° and 60°, whereas the corresponding angle of the distributor cone is between 45° and 55°, preferably 50°, and the width of the annular gap between the base of the distributor cone and the surrounding wall of the adsorber is between 50-100 millimeters.

According to a further feature of the present invention a discharge disk is arranged below the outlet opening to define with the latter a vertical gap, which preferably is adjustable, and a conduit branches off from the feed conduit and has an outlet end in the central region of the aforementioned disk for feeding part of the waste water into the vertical gap to thereby expedite passage of carbon through the outlet end, whereas valve means are arranged in the branch conduit for regulating the flow of waste water therethrough. This arrangement preferably further includes means for continuously withdrawing samples of the waste water from the adsorber in the region of 30–70%, preferably 50% of the height of the carbon column therein and an analyzer is connected to the sample withdrawing means for determining the concentration of the organic contaminants in the waste water. The analyzer is connected to the aforementioned valve means for automatically adjusting the latter to increase the flow of waste water therethrough with increasing concentration of the organic contaminants in the samples.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
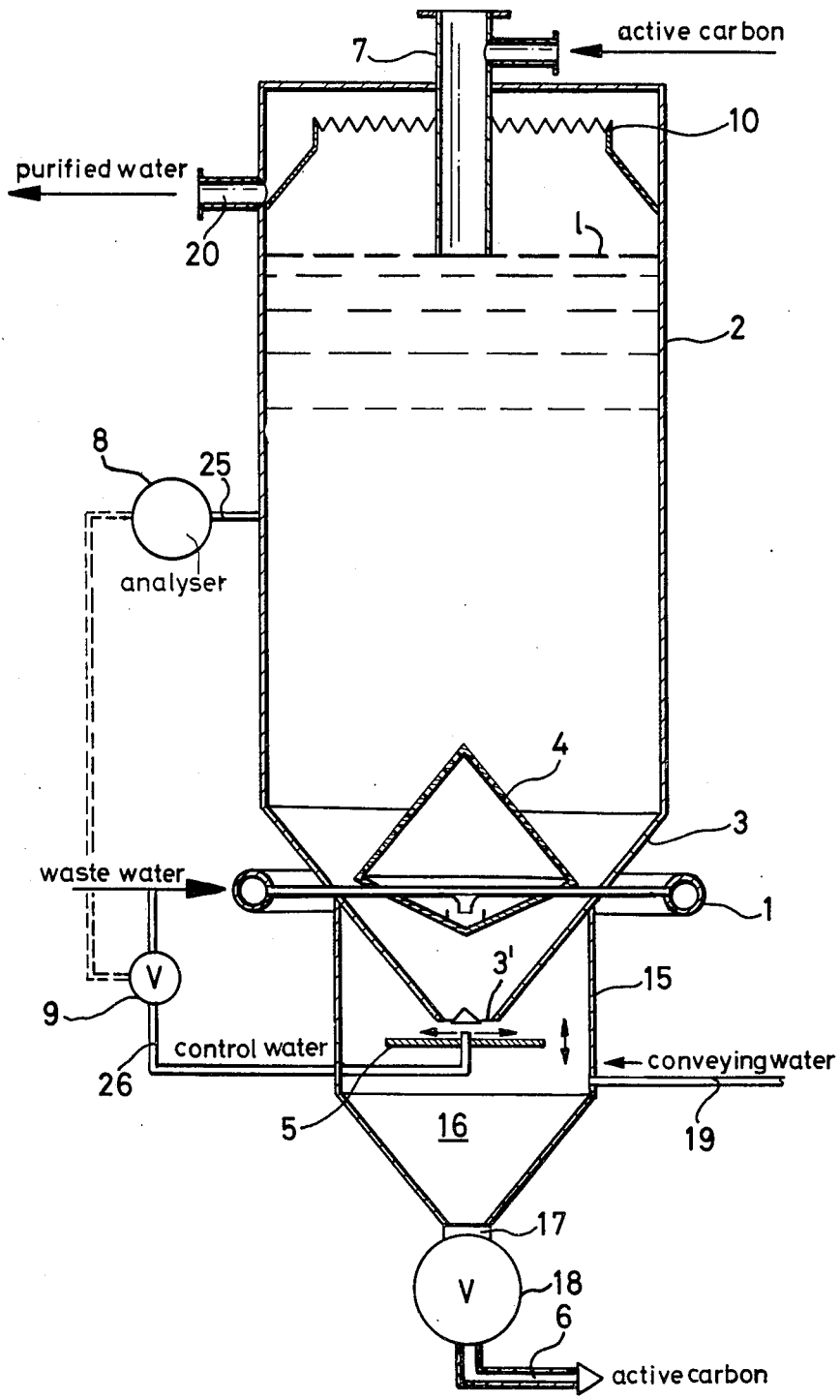
FIG. 1 is a schematic vertically cross-section of the adsorber.

The apparatus for purification of waste water with active carbon comprises, as shown in FIG. 1, an upright adsorber 2 provided at its upper end with inlet means 7 for continuously feeding active carbon into the adsorber 2 so that the active carbon forms a column filling the adsorber up to the level 1 indicated by the dashed line in FIG. 1. The adsorber 2 has a lower frustoconical outlet end 3 defining at its lower end an outlet opening 3'. A distributor cone 4 having its base approximately in the upper third of the outlet cone 3 is provided centrally in the lower end of the adsorber 2 and the conical wall of the distributor cone is provided with a plurality of substantially evenly distributed small apertures 13. The sum of the open cross-sections of the apertures 13 is about 0.1 to 1% of the transverse cross-section of the adsorber above the distributor cone. The base of the distributor cone defines between the circumference of the base and the wall of said outlet cone an annular gap 12, the width w of which is between 50 and 100 millimeters. The angle 14 (FIG. 2) included between a generatrix of the outlet cone and a horizontal line is between 50° and 60°, whereas the corresponding angle 11 of the distributor cone 4 is between 45° and 55°, preferably 50°. An annular conduit 1 surrounds the frustoconical outlet end of the adsorber into which waste water is fed, from a source not shown in the drawing, as schematically indicated in FIG. 1, and from which a plurality of conduits 1' lead into the interior of the distributing cone 4 to pass through the apertures 13 provided therein in upward direction through the downwardly moving column of active carbon in the adsorber. The waste water before being fed into the conduit 1 is first filtered by being passed through a multilayer filter, not shown in the drawing.

Figure 2:
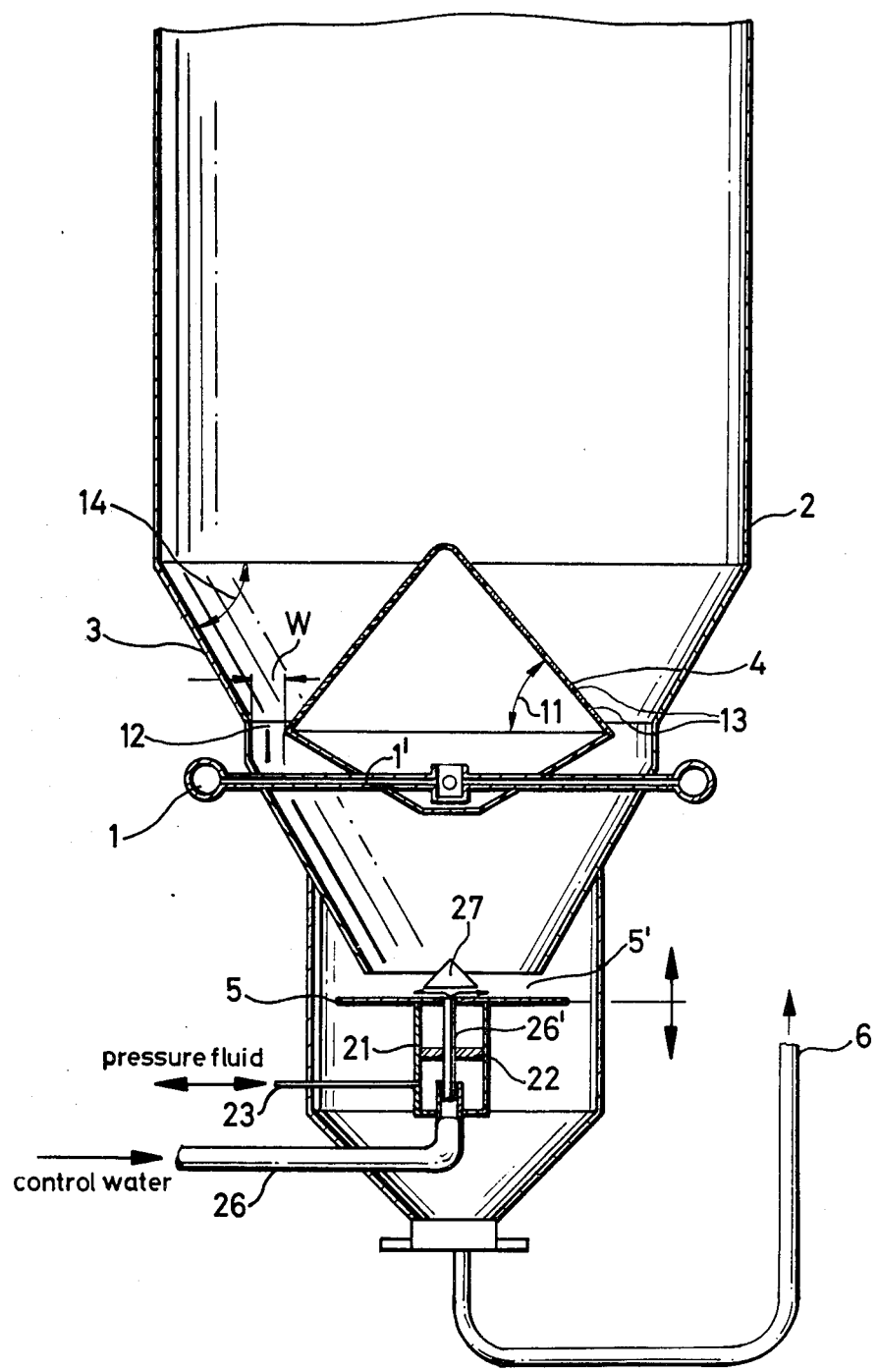
FIG. 2 is a schematic enlarged cross-section through the outlet end of the adsorber.

By arranging the sum of the open cross-sections of the apertures 13 in the distributor cone 4 to the transverse cross-section of the adsorber in the manner as mentioned above, the pressure loss of the waste water due to the passage through the apertures will be substantially equal to the pressure loss of the waste water during the passage thereof through the column of active carbon in the adsorber so that a uniform distribution of the waste water through the adsorber cross-section is obtained. The annular gap 12 between the base of the distributor cone 4 and the corresponding portion of the frustoconical outlet end 3 will assure a uniform discharge of the active carbon in the column through the whole adsorption cross-section. Wall means 15 are connected to the wall defining the outlet cone 3 to define below the outlet opening 3' a compartment 16 preferably in the shape as schematically shown in FIGS. 1 and 2. A discharge disk 5, preferably of a diameter larger than that of the outlet opening 3', is arranged in the compartment 16 coaxially with and downwardly spaced from the outlet opening 3' to define with the latter a vertical gap 5'. The active carbon passes downwardly in the adsorber 2 through the gap 12 and the outlet opening 3' and is discharged laden with the organic contaminants from the waste water over the discharge disk 5 into the compartment 16, the discharge end 17 of the latter, and over a normally open valve 18, into a conduit 6 from where it is transported hydraulically into a regenerator of known construction, not shown in the drawing, and from there it is likewise hydraulically transported back into the inlet conduit 7 of the adsorber with a speed of approximately 0.03 to 0.04 meters per second. To hydraulically transport the active carbon from the compartment 16 into the not-shown regenerator, conveying water is preferably fed through a conduit 19 into the compartment 16. An overflow weir 10 provided with a zig-zag upper edge is preferably mounted in the region of the upper end of the adsorber 2 above the level 1 of the carbon column therein, and the purified water flowing over the edge of the weir is discharged from the adsorber through the outlet conduit 20.

The height of the gap 5' between the outlet end 3' of the frustoconical outlet end of the adsorber and the discharge disk 5 is preferably adjustable, as indicated by the vertical double arrow in FIG. 2, for rough adjusting the speed at which the active carbon passes through the adsorber. For this purpose, a cylinder 21 may be arranged centrally in the compartment 16, as shown in FIG. 2, and a piston 22 connected to the discharge disk 5 so that by feeding pressure fluid through a conduit 23 into and out of the cylinder portion beneath the piston 22, the discharge disk 5 may be raised or lowered to thereby adjust the vertical height of the gap 5'.

According to a further feature of the present invention, the speed at which the active carbon travels through the adsorber is fine regulated automatically in a continuous manner. For this purpose samples of the waste water are continuously withdrawn from a region of the adsorber 2, located at a level of 30 to 70%, preferably at 50%, of the height of the column of active carbon therein, throughh a conduit 25 into an analyzer 8 in which the percentage of the organic contaminants contained in the samples is analyzed. This analyzer 8 may be a total organic carbon analyzer or an ultraviolet spectrometer. The desired value of the organic carbon to be measured equals, corresponding to the height at which the conduit communicates with the interior of the adsorber, likewise 30 to 70%, preferably 50% of the inlet concentration of the waste water. The arrangement includes further a branch conduit 26 branching off from the conduit feeding continuously waste water in the annular conduit 1 and this branch conduit leads through the cylinder 21 and the piston 22 therein and has an outlet opening at the center of the discharge disk 5. The upper portion 26' of the conduit 26 is fixed to the disk 5 and the piston 22 and is telescopically connected to the remainder of the conduit in the cylinder 21, as schematically indicated in FIG. 2. A valve 9 is arranged in the branch conduit 26 and this valve 9 cooperates with the analyzer 8 in a known manner to adjust the valve 9 in such a manner that when the desired value of the organic contaminants of the waste water determined by the analyzer 8 is surpassed, the valve 9 is opened further, whereas flow of waste water through the valve 9 is reduced when the value of the organic contaminants analyzed by the analyzer 8 is smaller than the desired value. A fixed rigid element 27 located centrally in the outlet opening 3' opposite the outlet end of the conduit 26 will deflect the waste water portion passing through the conduit 26 in radial direction, as indicated by the arrows in FIGS. 1 and 2, so that a localized fluidization of the active carbon emanating through the outlet opening 3' will be produced to thereby continuously adjust the speed at which the active carbon is discharged from the adsorber through the outlet end 3' in dependence on the concentration of the organic contaminants in the waste water. This will assure that the adsorption front will remain always at the same location of the column of active carbon.

The above-described apparatus was built for purification of 20 cubic meters per hour of waste water emanating from a coking plant with a medium content of organic carbon contaminants of 1000 milligrams per liter. The adsorber had a diameter of 1.6 meters and was filled up to a height of 2.4 meters with active carbon of a grain size of 2 millimeters. At a flow speed of the waste water of 10 meters per hour a pressure loss in the carbon column of 120 millimeters water column resulted.

The angle 14 at the frustoconical outlet end of the adsorber was chosen with 60° and the angle 11 of the distributor cone was chosen with 50°. The conical wall of the distributor cone was provided with 804 apertures of a diameter of 2 millimeters in order to obtain a total flow cross-section for the waste water of 2525 square millimeters. The annular gap between the base of the distributor cone and the wall of the frustoconical outlet end was chosen with a width of 100 millimeters, resulting in an outlet surface for the active carbon of 3.315 square meters.

The measuring of the concentration of the carbon contaminants in the waste water was carried out midway between the height of the carbon column. The desired value for the measurement was adjusted to 0.5 times the medium content of organic contaminants in the waste water, that is 500 milligrams per liter. At this concentration of organic carbon contaminants the medium flow speed of the active carbon in the adsorber was 0.13 meters per hour corresponding to an active carbon stream of 260 liters per hour. Under these conditions a medium loading of the active carbon by organic contaminants of 70 kilograms per cubic meter ±3% has been obtained. The content of organic contaminants in the purified waste water was 75 milligrams per liter, which corresponds to a purification efficiency of 92.5%.

If, for instance, the content of the organic carbon contaminants in the waste water is increased to 1,100 milligrams per liter, when this can be compensated by increasing the flow speed of the active carbon in the adsorber to 0.14 meters per hour. This resulted in a loading of the active carbon with organic carbon contaminants of 75 kilograms per cubic meter ±3%.

It will be understood that each of the elements described above, or two or more together, may also find a useful application in other types of apparatus for purification of waste water containing dissolved organic carbon contaminants differing from the types described above.

While the invention has been illustrated and described as embodied in an apparatus for purification of waste water containing dissolved organic carbon contaminants by active carbon, the flow speed of which through an adsorber is automatically regulated in dependence on the concentration of the organic contaminants in the waste water, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A method of purifying contaminated fluids in an upright vessel, comprising the steps of continuously admitting a flow of particulate purifying material into an upper end portion of the vessel, for downward movement therein; continuously admitting a flow of contaminated fluid into a confined space located in a lower end portion of the vessel and bounded in part by an upwardly tapering conical upper wall a generatrix of which includes with a horizontal line an angle of 45°–55°; continuously discharging the contaminated fluid from the confined space through a plurality of closely adjacent substantially uniformly arranged apertures in the upper wall, in form of individual upwardly flowing streams which are distributed over the entire cross-sectional area of the lower vessel end portion so that a purification front develops at which the downwardly moving particulate material is laden over the entire vessel cross-section with impurities removed from the upwardly moving contaminated fluid; and maintaining the location of the purification front substantially steady relative to the downwardly moving particulate material and to the vessel at a preselected level of the vessel.

2. A method as defined in claim 1; further comprising the steps of continuously measuring the concentration of contaminants in the contaminated fluid in the vessel; generating a signal indicative of the concentration; and regulating the addition of fresh particulate material and withdrawal of spent particulate material from the vessel, at a rate continuously proportional to the magnitude of said signal.

3. A method as defined in claim 1, wherein said particulate material is an adsorbent material, and the purification of the liquid comprises adsorbing impurities from said liquid on said adsorbent material.

4. Apparatus for purifying contaminated fluids with a particulate purifying material, comprising an upright vessel having an upper end portion and a lower end portion; first means for continuously admitting a flow of particulate purifying material into said upper end portion, for downward movement in said vessel; a generally conical hollow distributing element in said lower end portion and having an upwardly tapering wall provided with a plurality of substantially uniformly arranged apertures and a generatrix of which includes with a horizontal line an angle of 40°–60°; and second means for admitting a continuous flow of contaminated fluid into said hollow distributing element, so that the fluid escapes therefrom through said apertures in form of a plurality of individual upwardly flowing streams which due to said angle are distributed over the entire cross-section of said lower end portion, whereby a purification front develops at which the downwardly moving particulate purifying material is laden over the entire vessel cross-section with impurities removed from the fluid and which front can be maintained substantially steady relative to the downwardly moving particulate purifying material and to the vessel at a preselected level of the vessel.

5. Apparatus as defined in claim 4, wherein said angle is 50°.

6. Apparatus as defined in claim 4, said vessel having a conically shaped lower section provided with said lower end portion and in which said distributing element is mounted, the angle included between a generatrix of said lower end section and a horizontal line being between 50° and 60°.

* * * * *